US012533678B2

(12) United States Patent
Holsinger

(10) Patent No.: US 12,533,678 B2
(45) Date of Patent: Jan. 27, 2026

(54) APPARATUS AND METHODS FOR PIERCING A CENTRIFUGE TUBE

(71) Applicant: Kraton Corporation, The Woodlands, TX (US)

(72) Inventor: Roger Holsinger, Belpre, OH (US)

(73) Assignee: Kraton Corporation, Houston, TX (US)

( * ) Notice: Subject to any disclaimer, the term of this patent is extended or adjusted under 35 U.S.C. 154(b) by 1341 days.

(21) Appl. No.: 17/248,781

(22) Filed: Feb. 8, 2021

(65) Prior Publication Data

US 2021/0245164 A1 Aug. 12, 2021

Related U.S. Application Data

(60) Provisional application No. 62/971,525, filed on Feb. 7, 2020.

(51) Int. Cl.
*B01L 9/06* (2006.01)

(52) U.S. Cl.
CPC ........... *B01L 9/06* (2013.01); *B01L 2200/025* (2013.01); *B01L 2300/0672* (2013.01); *B01L 2300/08* (2013.01); *B01L 2300/0809* (2013.01); *B01L 2300/0858* (2013.01)

(58) Field of Classification Search
None
See application file for complete search history.

(56) References Cited

U.S. PATENT DOCUMENTS

2010/0206834 A1* 8/2010 Qian .................. B01L 3/50825 422/112
2019/0168209 A1* 6/2019 Sano ....................... B01L 3/502

FOREIGN PATENT DOCUMENTS

WO WO-2018021219 A1 * 2/2018 .............. B01L 3/502

* cited by examiner

*Primary Examiner* — Matthew D Krcha

(57) ABSTRACT

A fixture for facilitating a piercing of a centrifuge tube is disclosed. The centrifuge tube includes a bottom portion and a sidewall extending from the bottom portion. The fixture includes a frame having a base and an elongated member. The elongated member extends substantially perpendicularly to the base and is configured to support the bottom portion of the centrifuge tube. Also, the elongated member defines a bore for receiving a needle for piercing the bottom portion of the centrifuge tube. Further, the fixture includes a plate engaged with the frame and disposed spaced apart from the base and substantially parallel to the base. The plate defines an opening disposed coaxially with the bore for receiving and supporting the centrifuge tube.

18 Claims, 7 Drawing Sheets

APPARATUS AND METHODS FOR PIERCING A CENTRIFUGE TUBE

CROSS-REFERENCE TO RELATED APPLICATIONS

This application claims benefit to U.S. Provisional Application No. 62/971,525 with a filing date of Feb. 7, 2020, the entire disclosure of which is incorporated herein by reference.

TECHNICAL FIELD

The present disclosure relates, generally, to an apparatus and methods for piercing a centrifuge tube. More particularly, the present disclosure relates to a fixture for facilitating the piercing of the centrifuge tube.

BACKGROUND

In labs, for example, chemical labs, biomedical labs, hospital labs, etc., separation of different chemicals or different phases of a substance are carried out in centrifuge tubes. In order to remove the gradient materials from the centrifuge tube, a bottom of the centrifuge tube is pierced by using a needle. In so doing, a user, generally hold the centrifuge tube in one hand and pierce the centrifuge tube via the needle using other hand. Therefore, it is not easy to pierce the centrifuge tube bottom with a syringe needle correctly and safely.

Hence, there is a need for an apparatus that facilitate the piercing of a centrifuge tube with a syringe needle safely and expediently.

SUMMARY OF THE INVENTION

In a first aspect, a fixture for facilitating a piercing of a centrifuge tube is disclosed.

The centrifuge tube includes a bottom portion and a sidewall extending from the bottom portion. The fixture includes a frame having a base, an elongated member, and a plate. The elongated member extends substantially perpendicular to the base and is configured to support the bottom portion of the centrifuge tube. Also, the elongated member defines a bore for receiving a needle for piercing the bottom portion of the centrifuge tube. The plate is engaged with the frame and is disposed spaced apart from the base. Also, the plate is disposed substantially parallel to the base. Further, the plate defines an opening disposed coaxial with the bore for receiving and supporting the centrifuge tube.

In an embodiment, a method for piercing a centrifuge tube employing the fixture is disclosed. The method includes placing the needle inside the bore of the elongated member, and inserting the centrifuge tube though the opening to place the bottom portion of the centrifuge tube on the elongated member. The method further includes tapping the centrifuge tube to facilitate the piercing of the bottom portion of the centrifuge tube by the needle.

In a second aspect, a fixture for facilitating a piercing of a centrifuge tube is disclosed. The centrifuge tube includes a bottom portion and a sidewall extending from the bottom portion. The fixture includes a frame having a base, an elongated member, and a plate. The elongated member extends substantially perpendicularly to the base and is configured to support the bottom portion of the centrifuge tube. Also, the elongated member defines a bore for receiving a needle for piercing the bottom portion of the centrifuge tube. Further, the plate is engaged with the frame and is disposed spaced apart from the base. The plate is also disposed substantially parallel to the base. Further, the plate defines an opening disposed coaxial with the bore for receiving and supporting the centrifuge tube. Furthermore, at least one of the elongated member or the plate includes a slit for facilitating an insertion of the needle inside the bore.

In another aspect, a fixture for facilitating a piercing of a centrifuge tube is disclosed. The centrifuge tube includes a bottom portion and a sidewall extending from the bottom portion. The fixture includes a frame having a base, an elongated member, a first plate, and a second plate. The elongated member extends substantially perpendicular to the base and is configured to support the bottom portion of the centrifuge tube. The elongated member defines a bore for receiving a needle for piercing the bottom portion of the centrifuge tube. Further, the first plate is engaged with the frame and is disposed spaced apart from the base. Also, the first plate is disposed substantially parallel to the base. The first plate defines an opening disposed coaxial with the bore for receiving and supporting the centrifuge tube. Further, at least one of the elongated member or the first plate includes a slit for facilitating an insertion of the needle inside the bore. Furthermore, the second plate is engaged with the frame and is disposed space apart from the first plate. Also, the second plate is disposed substantially parallel to the first plate. Further, the first plate is disposed between the base and the second plate and defines a cavity disposed coaxial with the opening for receiving and supporting the centrifuge tube.

DETAILED DESCRIPTION

The following terms are used in the specification with the following meanings:

"Centrifuge tube" refers to a tube or container, containing liquid having separate components, e.g., different densities, viscosities, shapes or sizes. In embodiments, besides liquid there can be solid (sediments collected at the bottom). The components can be separated by using centrifugation, the rapid rotation of the tube around a fixed axis to separate into components.

The present disclosure relates to a fixture for facilitating a piercing in the bottom portion of a centrifuge tube safely. The piercing of the centrifuge tube may be performed for facilitating an extraction of one or more gradient materials from the centrifuge tube after the needle is inserted (by piercing the hemispherical or conical bottom).

In embodiments, the fixture can be constructed out of any of metal, e.g., steel, aluminum, etc., metal alloys, engineering thermoplastics, wood, and the like. The fixture is provided with a frame and a horizontal plate engaged with the frame. The plate has an opening for receiving and supporting the centrifuge tube. The piercing of the centrifuge tube is via the use of a needle (for subsequent connection to a syringe).

In operation, the centrifuge tube is held in place by the fixture, with the hemispherical or conical bottom being brought in contact with the needle held in a stand-up position, with the sharp tip pointed upward. By pressing the centrifuge tube with a light tap, the hemispherical or conical bottom is pierced by the needle. After the tip (hemispherical or conical bottom) of the centrifuge tube is pierced with the needle connected hereto, a syringe can be attached to the needle to extract the desired component(s) from the centrifuge tube. The desired component(s) are extracted according to the density or gradient separation of the components in the tube.

It should be noted that the fixture may have more than one horizontal plate, e.g., two or three plates, and the plates are removable (for swapping in and out), for holding centrifuge tubes of different lengths or sizes.

Reference will be made to the figures, showing various embodiments of the fixture and methods for using thereof.

Figure 1:
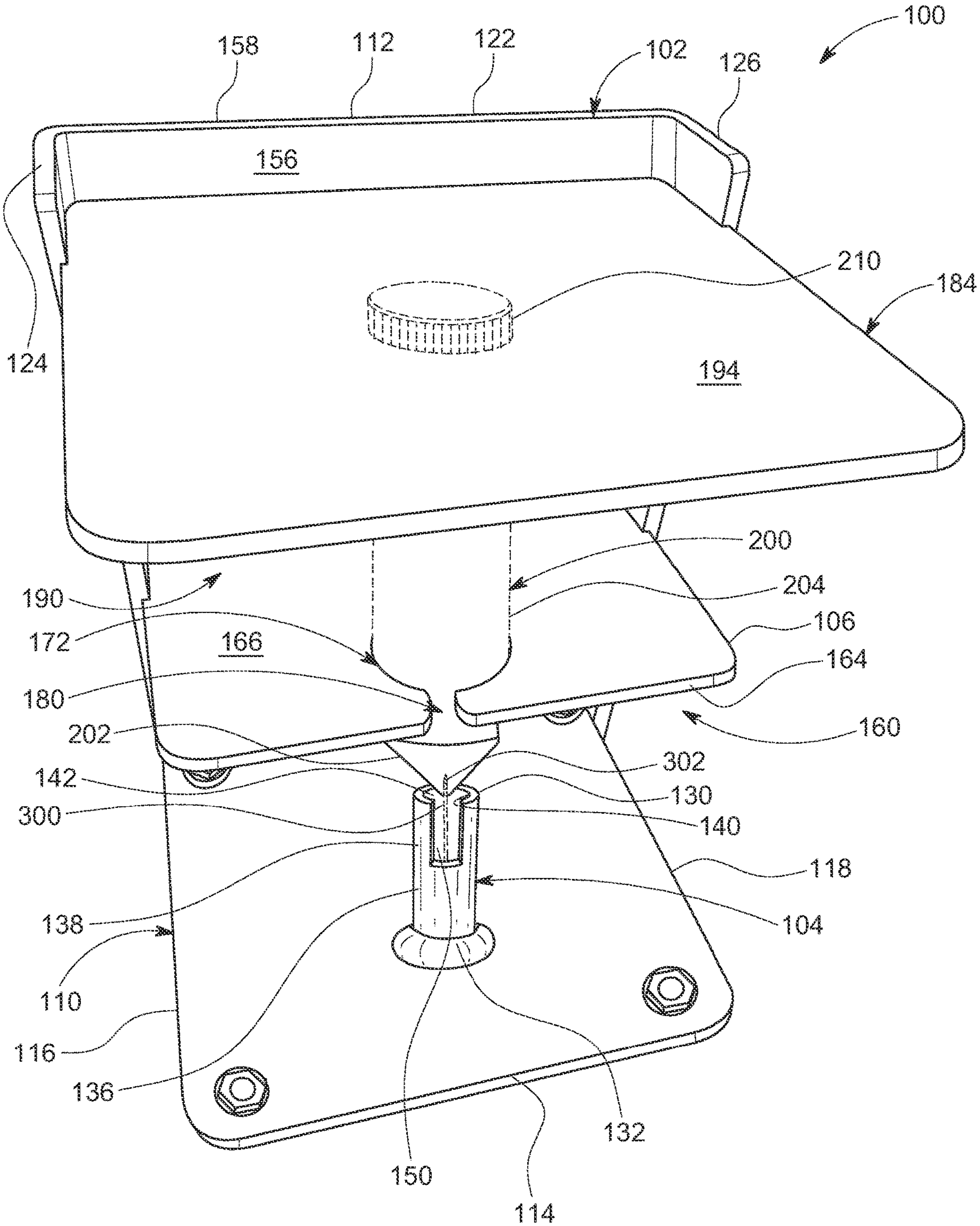
FIG. 1 is a perspective view of a fixture suitable for holding a centrifuge tube and piercing the centrifuge tube using a needle, in accordance with an embodiment of the disclosure.
Figure 2:
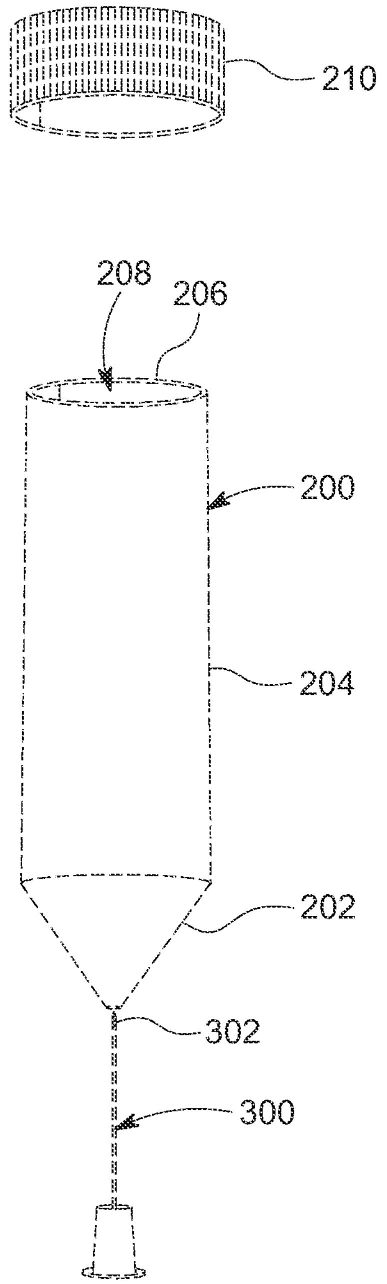
FIG. 2 illustrates a front view of the centrifuge tube and the needle, in accordance with an embodiment of the disclosure.

Referring to FIG. 1, a fixture 100 suitable for holding a centrifuge tube 200 and facilitating a piercing of the centrifuge tube 200 using a needle 300 is shown. As shown in FIG. 2, the centrifuge tube 200 includes a bottom portion 202 and a sidewall 204 extending upwardly from the bottom portion 202. In an embodiment, the bottom portion 202 may be of a hemispherical shape or a conical shape, and the sidewall 204 may extend from the bottom portion 202 in a shape of a cylinder. The sidewall 204 may include an upper edge 206 that defines an access opening 208 of the centrifuge tube 200. The access opening 208 may facilitate an entry of a material inside the centrifuge tube 200. Further, the centrifuge tube 200 may include a cap 210 to cover the access opening 208. In an embodiment, the cap 210 may be removably coupled to the sidewall 204 via threads (not shown).

Referring to FIG. 1, FIG. 3, FIG. 4, and FIG. 5, the fixture 100 includes a frame 102, an elongated member 104, and a plate 106 (hereinafter referred to as a first plate 106) coupled to the frame 102. The frame 102 may include a base 110 and a side structure 112 (best shown in FIG. 3) extending substantially perpendicular to the base 110. The base 110 provides a support structure for supporting the frame 102 on a surface. As shown, the base 110 may include a rectangular shape having one or more edges, for example a first edge 114, a second edge 116, a third edge 118, and a fourth edge 120 (shown in FIG. 3). Although, a rectangular base is contemplated, it may be appreciated the base 110 may include any other shape, such as, but not limited to, a square, a pentagon, a polygon, a triangular, or any other shape known in the art. In embodiments, the side structure 112 may define a C-shape (best shown in FIG. 5), and may include a first sidewall 122 extending substantially perpendicularly and upwardly from the fourth edge 120 (best shown in FIG. 3), a second sidewall 124 extending substantially perpendicularly and upwardly from the second edge 116, and a third sidewall 126 extending substantially perpendicularly from the third edge 118 (best shown in FIG. 3). As illustrated, the first sidewall 122 may extend along an entire length of the fourth edge 120, while the second sidewall 124 and the third sidewall 126 may extend, respectively, along full length or a partial length of the second edge 116 and full length or a partial length of the third edge 118. Also, the second sidewall 124 and the third sidewall 126 may be disposed substantially parallel to each other and may be positioned substantially perpendicular to the first sidewall 122.

The elongated member 104 is adapted to support the centrifuge tube 200 and extends substantially perpendicularly to the base 110. In an embodiment, the elongated member 104 is a hollow member including a first longitudinal end 130, a second longitudinal end 132, a wall 136 having an outer surface 138 and an inner surface 140. The second longitudinal end 132 is coupled or attached to the base 110. In an embodiment, the second longitudinal end 132 (i.e. the elongated member 104) may be fixedly attached to the base 110. Alternatively, the second longitudinal end 132 (i.e., the elongated member 104) may be removably attached to the base 110 using one or more fasteners, or it can be screwed onto the base 110 (not shown). Further, the inner surface 140 of the wall 136 defines a bore 142 extending in a longitudinal direction. The bore 142 extends from the first longitudinal end 130 towards the second longitudinal end 132. In an embodiment, the bore 142 may extend from the first longitudinal end 130 to the second longitudinal end 132, and is therefore defined a through hole. The bore 142 is adapted to receive the needle 300 for facilitating the piercing of the centrifuge tube 200 supported by the first longitudinal end 130 of the elongated member 104. In certain embodiment, the elongated member 104 may include a slit 150 (hereinafter referred to a first slit 150) extending through the wall 136 from the outer surface 138 to the inner surface 140 to facilitate an insertion or placement of the needle 300 inside the bore 142. As shown, the first slit 150 extends from the first longitudinal end 130, and may extend along a partial length of the elongated member 104. In certain scenarios, the first slit 150 may extend along a full length of the elongated member 104.

Figure 3:
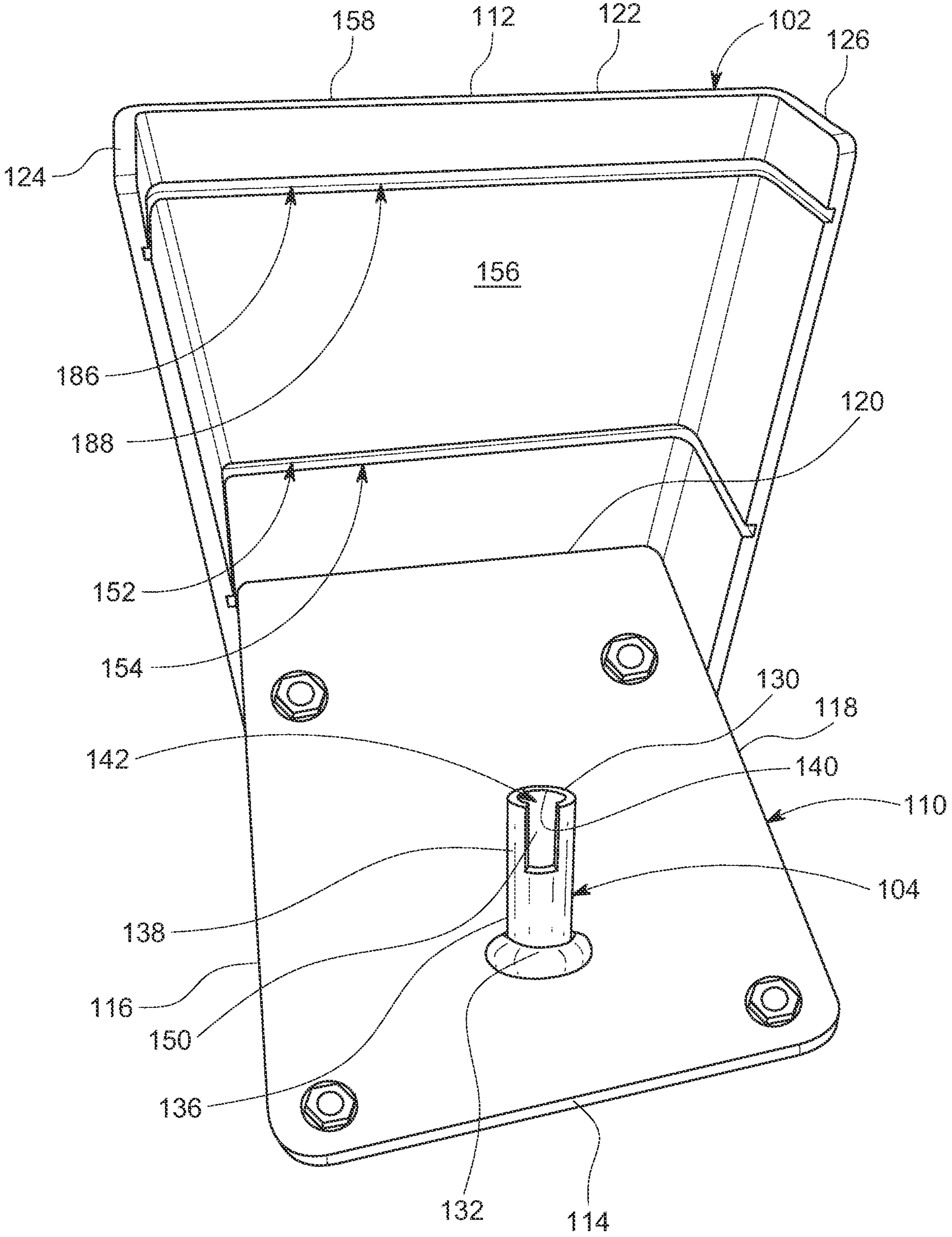
FIG. 3 is a perspective view of the fixture of FIG. 1 from which a first plate and a second plate have been removed, in accordance with an embodiment of the disclosure.

Further, the first plate 106 is adapted to support the sidewall 204 of the centrifuge tube 200 within the fixture 100 and is engaged/coupled to the side structure 112 of the frame 102. In an embodiment, the first plate 106 is fixedly attached to the side structure 112. Alternatively, the first plate 106 is removably engaged with the side structure 112. To facilitate a removable engagement of the first plate 106 with the frame 102, the side structure 112 may include a retention structure 152 (shown in FIG. 3) for receiving a portion of the first plate 106 and holding and supporting the first plate 106 with the frame 102. In an embodiment, as shown in FIG. 3, the retention structure 152 may be a slot 154 (hereinafter referred to as a first slot 154) formed/defined into the side structure 112. The first slot 154 may extend from a first surface 156 of the side structure 112 towards a second surface 158 of the side structure 112. Therefore, the first slot 154 is defined as a blind slot. As illustrated, the first slot 154 may extend along entire width of each of the first sidewall 122, the second sidewall 124 and the third sidewall 126. In an embodiment, the first slot 154 may extend only into the first sidewall 122 and the portions of the first slot 154 extending into the second sidewall 124 and the third sidewall 126 may be omitted. In an embodiment, a portion of the first slot 154 extending into the first sidewall 122 may be omitted. To engage the first plate 106 with the frame 102, a portion of the first plate 106 is slid into the first slot 154 and retained inside the first slot 154. In this manner, the first plate 106 is engaged with the side structure 112 (i.e. the frame 102). Although, the first slot 154 is contemplated as the retention structure 152, it may be envisioned that the retention structure 152 may be a protrusion (not shown) extending outwardly from the first surface 156 of the side structure 112. In such a case, the first plate 106 may rest on the protrusion.

Further, the first plate 106 is disposed substantially parallel to the base 110, and is located spaced apart (i.e. at a distance) from the base 110, thereby defining a gap 160 (hereinafter referred to as a first gap 160) between the first plate 106 and the base 110. A shape of the first plate 106 may be similar to the shape of the base 110, and may include a rectangular shape. Further, the first plate 106 may include one or more free edges, for example a free edge 164, a first surface 166, and a second surface 168 (best shown in FIG. 4) disposed opposite to the first surface 166 and facing the base 110. The first plate 106 defines an opening 172 that extends from the first surface 166 to the second surface 168 to receive the centrifuge tube 200. Further, the opening 172 is disposed coaxially to the bore 142 to facilitate an extension of the centrifuge tube 200 though the opening 172 such that the bottom portion 202 may abut or rest on the first longitudinal end 130 of the elongated member 104, and the first plate 106 may hold or support the sidewall 204 of the centrifuge tube 200. Also, the first plate 106 includes a slit 180 (hereinafter referred to as the second slit 180) for facilitating an insertion of the needle 300 inside the bore 142. As shown, the second slit 180 extends longitudinally from the second surface 168 to the first surface 166, and may also extend from the free edge 164 inside a body of the first plate 106 to the opening 172.

Additionally, or optionally, the fixture 100 may include a second plate 184 adapted to hold/support the sidewall 204 of the centrifuge tube 200 within the fixture 100. The second plate 184 is engaged/coupled to the side structure 112 of the frame 102 and is disposed substantially parallel to the first plate 106. In an embodiment, the second plate 184 is fixedly attached to the side structure 112. Alternatively, the second plate 184 is removably engaged with the side structure 112. To facilitate the removable engagement of the second plate 184 with the side structure 112 (i.e. the frame 102), the side structure 112 may include a retention structure 186 (best shown in FIG. 3) for receiving a portion of the second plate 184 and holding and supporting the second plate 184 with the frame 102. In an embodiment, as shown in FIG. 3, the retention structure 186 may be a slot 188 (hereinafter referred to as a second slot 188) formed/defines into the side structure 112. In an embodiment, the second slot 188 may extend from the first surface 156 of the side structure 112 towards the second surface 158 of the side structure 112. Therefore, the second slot 188 is defined as a blind slot. As illustrated, the second slot 188 may extend along entire width of each of the first sidewall 122, the second sidewall 124 and the third sidewall 126. In an embodiment, the second slot 188 may extend only into the first sidewall 122 and the portions of the second slot 188 extending into the second sidewall 124 and the third sidewall 126 may be omitted. In an embodiment, a portion of the second slot 188 extending into the first sidewall 122 may be omitted. To engage the second plate 184 with the frame 102, a portion of the second plate 184 is slid into the second slot 188 and retained inside the second slot 188. In this manner, the second plate 184 is engaged with the side structure 112 (i.e. the frame 102). Although, the second slot 188 is contemplated as the retention structure 186, it may be envisioned that the retention structure 186 may be a protrusion extending outwardly from the first surface 156 of the side structure 112. In such a case, the second plate 184 may rest on the protrusion, and thereby removably engaged with the frame 102.

Figure 4:
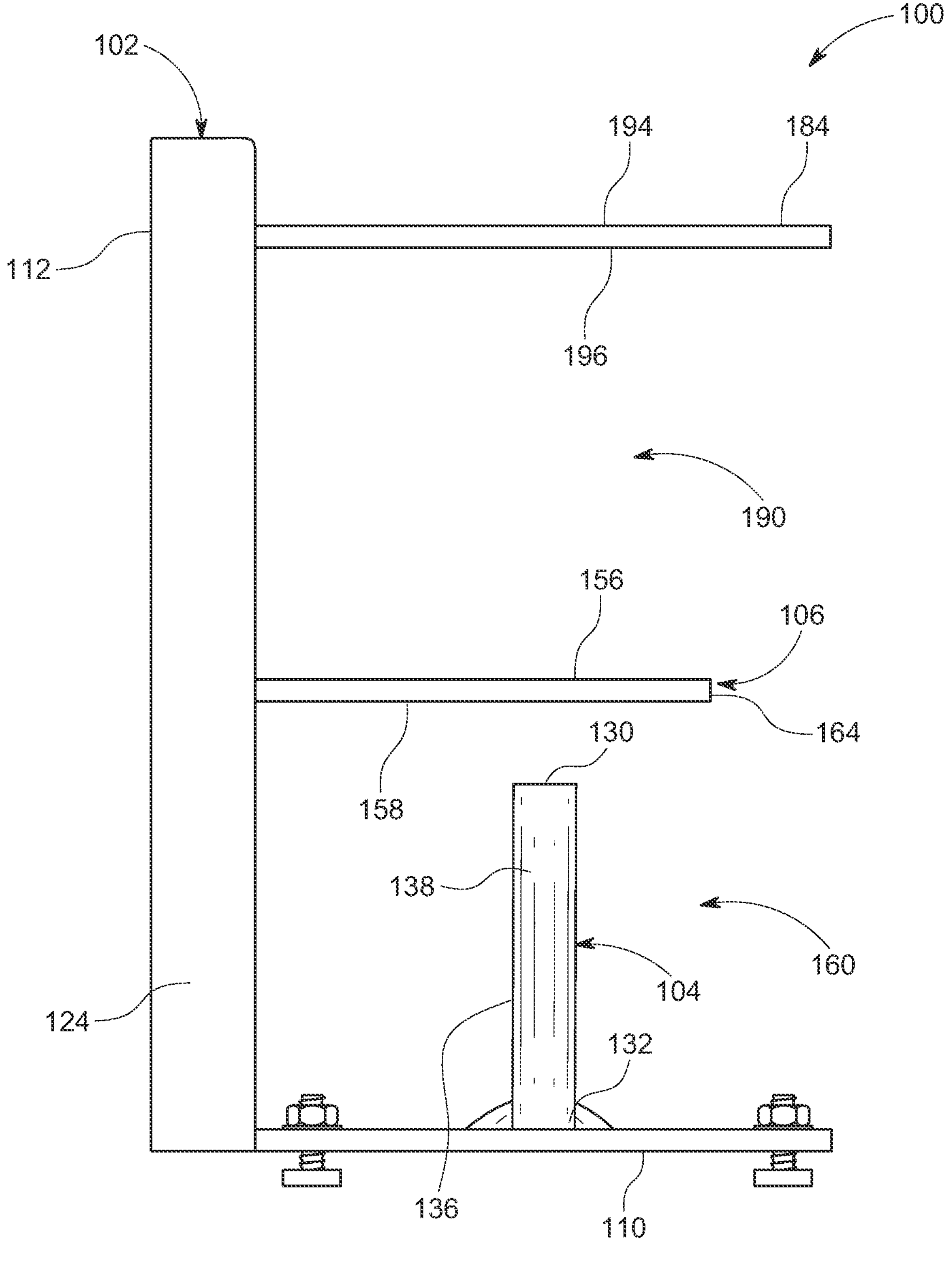
FIG. 4 is a side view of the fixture of FIG. 1, in accordance with an embodiment of the disclosure.
Figure 5:
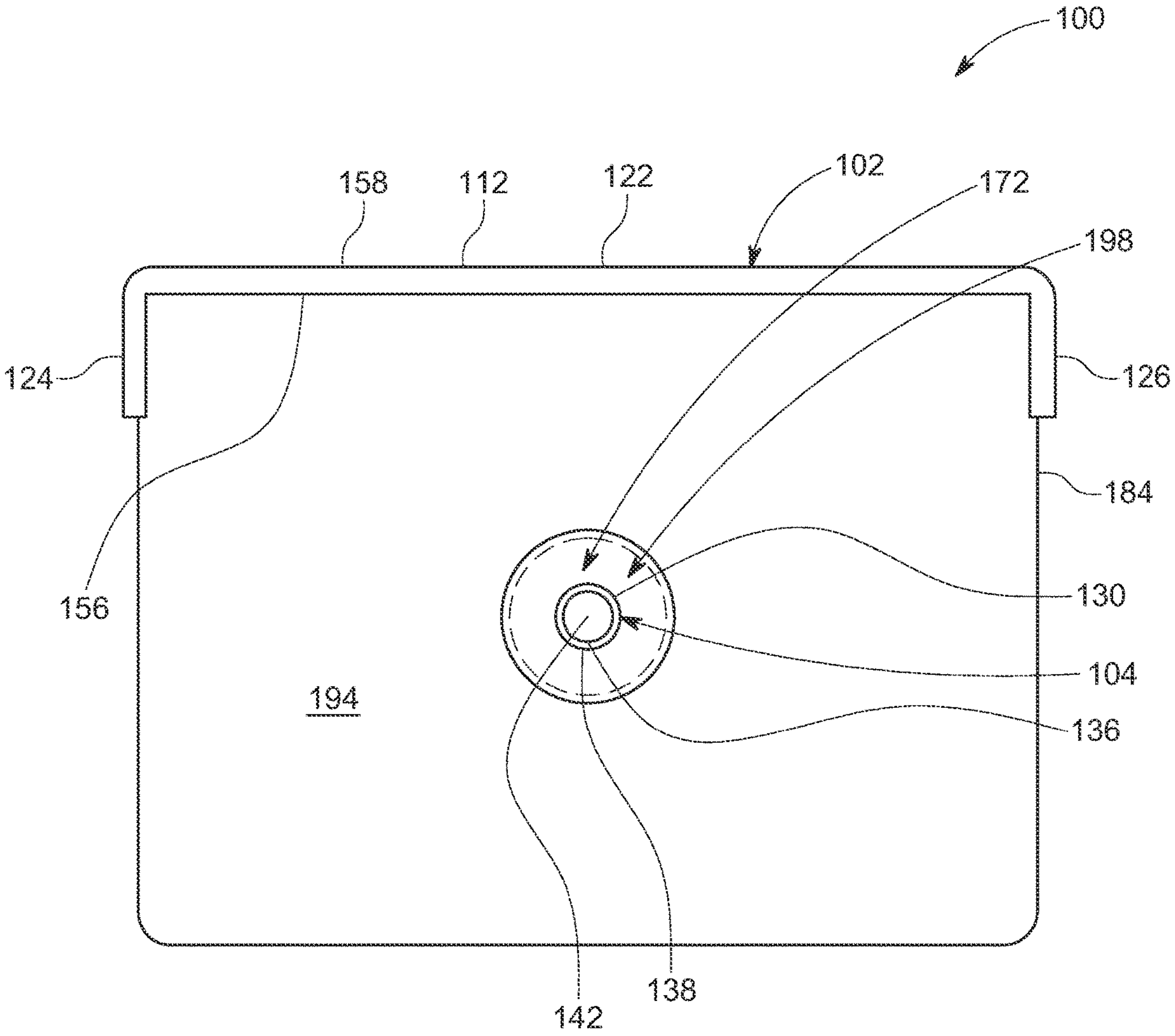
FIG. 5 is a top view of the fixture of FIG. 1, in accordance with an embodiment of the disclosure.

As illustrated, the second plate 184 is located spaced apart (i.e. at a distance) from the base 110 such that the first plate 106 is disposed between the base 110 and the second plate 184. In this manner, a gap 190 (hereinafter referred to as a second gap 190), best shown in FIG. 4, is defined between the first plate 106 and the second plate 184. A shape of the second plate 184 may be similar to the shape of the base 110 and/or the first plate 106, and may include a rectangular shape. Further, the second plate 184 may include a first surface 194 and a second surface 196 (shown in FIG. 4) disposed opposite to the first surface 194. The second plate 184 defines a cavity 198 (shown in FIG. 5) that extends from the first surface 194 to the second surface 196. The cavity 198 facilitates an insertion of the centrifuge tube 200 into the fixture 100 for piercing the bottom portion 202 of the centrifuge tube 200. Further, the cavity 198 is disposed coaxially to the bore 142 and the opening 172 to facilitate an insertion and extension of the centrifuge tube though the cavity 198 such that the bottom portion 202 may abut or rest on the first longitudinal end 130 of the elongated member 104, and the first plate 106 and the second plate 184 may hold or support the sidewall 204 of the centrifuge tube 200. The cavity 198 is of the same size or larger in size than the opening 172. The cavity 198 and the opening 172 can be of different shapes, such as, but not limited to, a circle, a square, a pentagon, a polygon, a triangular, or any other shape known in the art to match the centrifuge tube.

In an embodiment, one or more components or structure of the fixture 100 can be made from stainless steel. Although, the fixture 100 made of stainless steel is contemplated, it may be appreciated that fixture 100 can be made of any other material, such as, but not limited to, fiber reinforce composites, plastics, any metal, alloys, or any other material known in the art.

In certain implementations, the fixture 100 may be utilized in labs, for example, chemical labs, biomedical labs, hospital labs, or any other place where the piercing of a tube, such as the centrifuge tube 200, is necessary for removing one or more gradient materials disposed/stored inside the tube.

Figure 6:
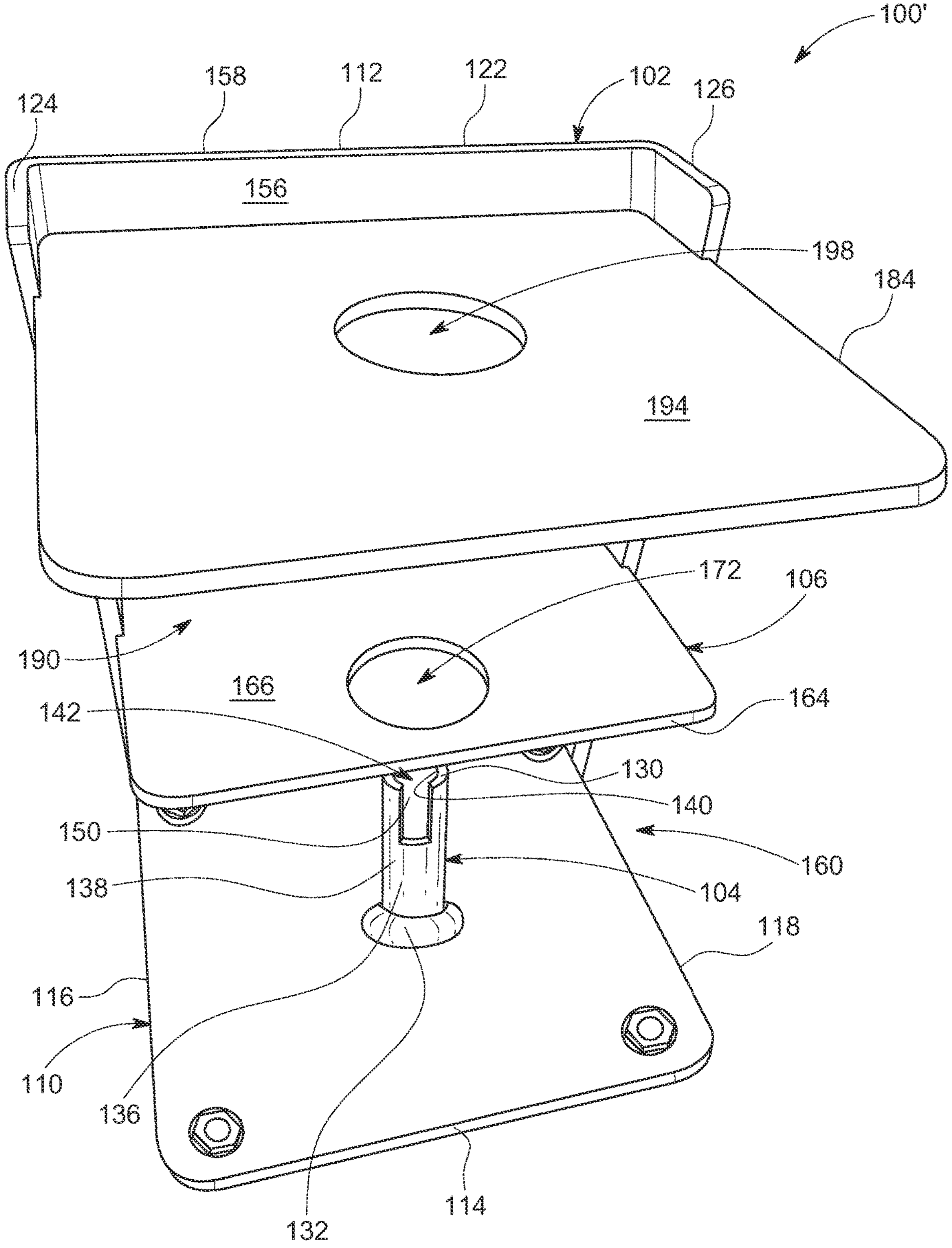
FIG. 6 is a perspective view of a fixture suitable for holding a centrifuge tube and piercing the centrifuge tube using a needle, in accordance with an alternative embodiment of the disclosure.

Referring to FIG. 6, a fixture 100' according to an alternative embodiment of the disclosure is shown. The fixture 100' is similar to the fixture 100 except that the fixture 100' includes only the first slit 150 and the second slit 180 is omitted.

Figure 7:
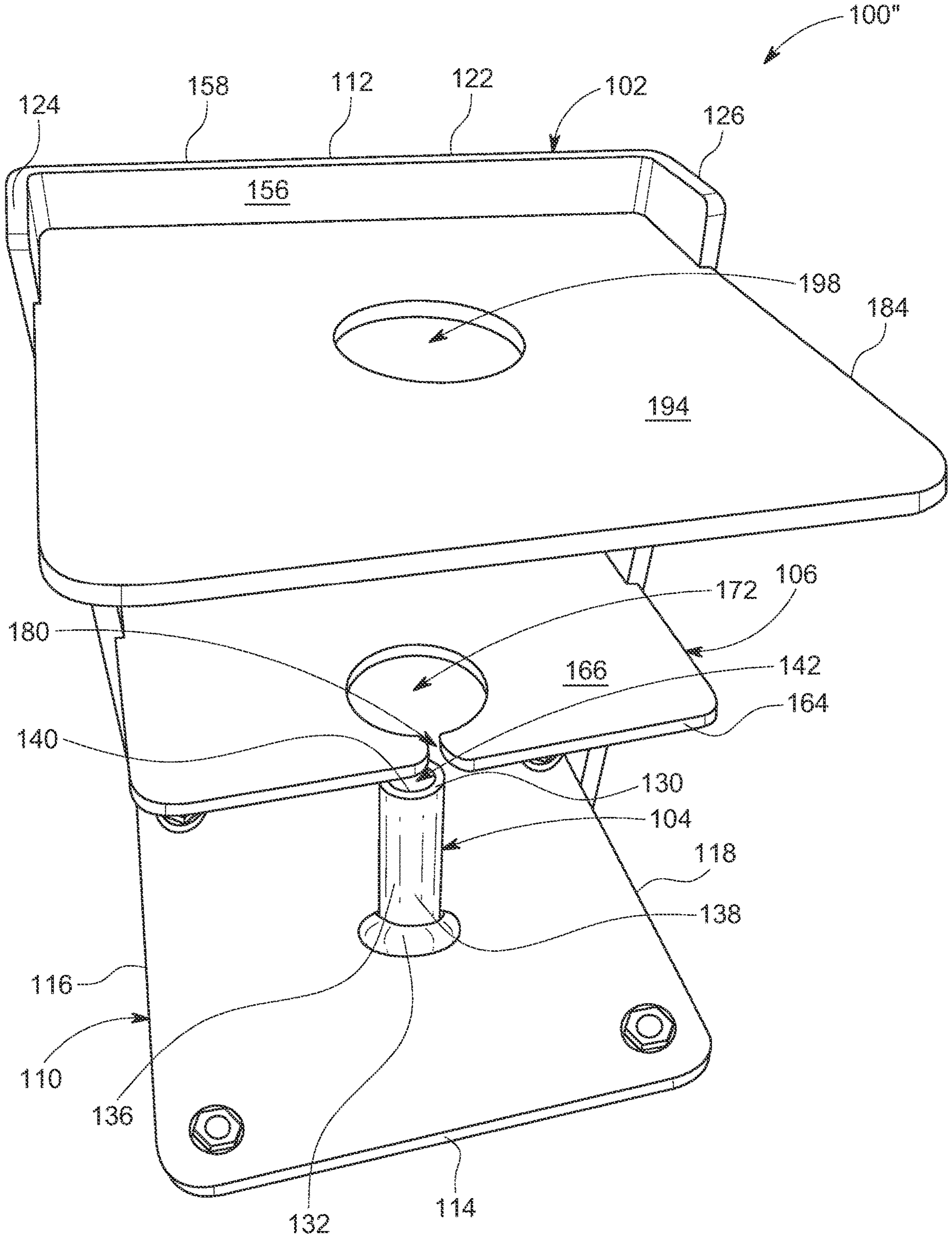
FIG. 7 is a perspective view of a fixture suitable for holding a centrifuge tube and piercing the centrifuge tube using a needle, in accordance with an alternative embodiment of the disclosure.

Referring to FIG. 7, a fixture 100" according to yet another embodiment of disclosure. The fixture 100" is similar to the fixture 100 except that the fixture 100" includes only the second slit 180 and the first slit 150 is omitted.

A method for piercing the centrifuge tube 200 using the fixture 100 is now explained. For piercing the centrifuge tube 200, an operator or user places the needle 300 inside the bore 142. For so doing, the operator or user may insert the needle 300 inside the bore 142 through the first slit 150 and/or the second slit 180. The needle 300 may be placed inside the bore 142 such that a portion of a bevel 302 (shown in FIG. 2) of the needle 300 may be disposed/protrude outside the bore 142. Alternatively, an end of the bevel 302 of the needle 300 is flush with an upper edge of the elongated member 104. After, placing the needle 300 inside the elongated member 104, the operator or user may insert the centrifuge tube 200 inside the fixture 100 though the cavity 198, and place the bottom portion 202 on the first longitudinal end 130 of the elongated member 104. In so doing, the centrifuge tube 200 extends through the opening 172 and the cavity 198, and the sidewall 204 of the centrifuge tube 200 is held/supported by the first plate 106 and the second plate 184. Thereafter, the operator and the user may tap a top end of the centrifuge tube 200 so that the bevel 302 pierces the bottom portion of the centrifuge tube 200 and enter inside the centrifuge tube 200. In an embodiment, the bevel 302 of the needle 300 may pierce and enter inside the centrifuge tube 200 during the insertion of the centrifuge tube 200 inside the fixture 100 and placement on the elongated member 104. In this manner, the fixture 100 allows for a safe and correct piercing of the centrifuge tube 200. In embodiments, the first plate 106 and the second plate 184 can be removed, for the fixture 100 to allow piercing of centrifuge tubes of varying diameter by changing the first plate 106 and the second plate 184 with the first plate and the second plate having opening and cavity of appropriate geometries, diameters, sizes.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

As used herein, the term "include" and its grammatical variants are intended to be non-limiting, such that recitation of items in a list is not to the exclusion of other like items that can be substituted or added to the listed items. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Although the terms "comprising" and "including" have been used herein to describe various aspects, the terms "consisting essentially of" and "consisting of" can be used in place of "comprising" and "including" to provide for more specific aspects of the disclosure and are also disclosed.

Unless otherwise defined, all terms have the same meaning as commonly understood by one of ordinary skill in the art to which this invention belongs. The singular forms "a," "an," and "the," include plural references unless expressly and unequivocally limited to one referent.

The invention claimed is:

1. A fixture for facilitating a piercing of a centrifuge tube using a needle, the centrifuge tube includes a bottom portion and a sidewall extending from the bottom portion, the fixture comprising:

a frame having a base;

an elongated member extending substantially perpendicularly to the base and configured to support the bottom portion of the centrifuge tube, the elongated member having a wall with an inner surface and an outer surface, the inner surface defining a bore, and the elongated member including a slit extending from the outer surface to the inner surface and at least partially along a length of the elongated member; and a plate engaged with the frame and disposed spaced apart from the base and substantially parallel to the base, the plate defines an opening disposed coaxially with the bore for receiving and supporting the centrifuge tube;

wherein the slit in the elongated member is configured for lateral insertion of the needle into the bore, and the bore is configured to receive the needle for piercing the bottom portion of the centrifuge tube.

2. The fixture of claim 1, wherein the frame includes a side structure extending substantially perpendicularly from the base and adapted to engage with the plate.

3. The fixture of claim 2, wherein the side structure includes a first slot for receiving the plate and facilitating a removable engagement of the plate with the frame.

4. The fixture of claim 2, wherein the side structure defines a C-shape.

5. The fixture of claim 1, wherein the plate includes a slit extending from a free edge of the plate to the opening.

6. The fixture of claim 1, wherein the plate is a first plate and the fixture further includes a second plate engaged with the frame and disposed space apart from the first plate and substantially parallel to the first plate such that the first plate is disposed between the base and the second plate, the second plate defines a cavity disposed coaxially with the opening for receiving and supporting the centrifuge tube.

7. The fixture of claim 6, wherein the frame includes a side structure extending substantially perpendicularly to the base, the side structure defines a second slot for receiving the second plate and facilitating a removable engagement of the second plate with the frame.

8. The fixture of claim 1, wherein the elongated member is removably coupled to the base.

9. A method for piercing a centrifuge tube, the method including:

providing the fixture of claim 1;

placing the needle inside the bore of the elongated member;

inserting the centrifuge tube through the opening to place the bottom portion of the centrifuge tube on the elongated member; and tapping the centrifuge tube to facilitate the piercing of the bottom portion of the centrifuge tube by the needle.

10. A fixture for facilitating a piercing of a centrifuge tube using a needle, the centrifuge tube includes a bottom portion and a sidewall extending from the bottom portion, the fixture comprising:

a frame having a base;

an elongated member extending substantially perpendicularly to the base and configured to support the bottom portion of the centrifuge tube, the elongated member having a wall with an inner surface and an outer surface, the inner surface defining a bore, and the elongated member including a slit extending from the outer surface to the inner surface and at least partially along a length of the elongated member;

wherein the slit in the elongated member is configured for lateral insertion of the needle into the bore, and the bore is configured to receive the needle for piercing the bottom portion of the centrifuge tube; and a plate engaged with the frame and disposed spaced apart from the base and substantially parallel to the base, the plate defines an opening disposed coaxially with the bore for receiving and supporting the centrifuge tube;

wherein the plate includes a slit extending from a free edge of the plate to the opening for facilitating an insertion of the needle inside the bore.

11. The fixture of claim 10, wherein the slit corresponds to a second slit of the plate, the second slit extends from a free edge of the plate to the opening.

12. The fixture of claim 10, wherein the frame includes a side structure extending substantially perpendicularly from the base and adapted to engage with the plate, the side structure including a first slot for receiving the plate and facilitating a removable engagement of the plate with the frame.

13. The fixture of claim 10, wherein the plate is a first plate and the fixture further includes a second plate engaged with the frame and disposed space apart from the first plate, the second plate is disposed substantially parallel to the first plate such that the first plate is disposed between the base and the second plate, the second plate defines a cavity disposed coaxial with the opening for receiving and supporting the centrifuge tube.

14. The fixture of claim 13, wherein the frame includes a side structure extending substantially perpendicularly to the base, the side structure defines a second slot for receiving the second plate and facilitating a removable engagement of the second plate with the frame.

15. The fixture of claim 10, wherein the elongated member is removably coupled to the base.

16. A fixture for facilitating a piercing of a centrifuge tube using a needle, the centrifuge tube includes a bottom portion and a sidewall extending from the bottom portion, the fixture comprising:

a frame having a base;

an elongated member extending substantially perpendicularly to the base and configured to support the bottom portion of the centrifuge tube, the elongated member having a wall with an inner surface and an outer surface, the inner surface defining a bore, and the elongated member including a slit extending from the outer surface to the inner surface and at least partially along a length of the elongated member;

wherein the slit in the elongated member is configured for lateral insertion of the needle into the bore, and the bore is configured to receive the needle for piercing the bottom portion of the centrifuge tube;

a first plate engaged with the frame and disposed spaced apart from the base and substantially parallel to the base, the first plate defines an opening disposed coaxial with the bore for receiving and supporting the centrifuge tube, wherein the first plate includes a second slit extending from a free edge of the first plate to the opening for facilitating an insertion of the needle inside the bore; and a second plate engaged with the frame and disposed spaced apart from the first plate and substantially parallel to the first plate, the first plate is disposed between the base and the second plate and defines a cavity disposed coaxial with the opening for receiving and supporting the centrifuge tube.

17. The fixture of claim 16, wherein the frame includes a side structure extending substantially perpendicularly from the base and adapted to engage with the first plate, the side structure including a first slot for receiving the first plate and facilitating a removable engagement of the first plate with the frame.

18. The fixture of claim 16, wherein the frame includes a side structure extending substantially perpendicularly to the base, the side structure defines a second slot for receiving the second plate and facilitating a removable engagement of the second plate with the frame.

* * * * *